(12) United States Patent
Shintani

(10) Patent No.: US 10,362,213 B2
(45) Date of Patent: Jul. 23, 2019

(54) IMAGING APPARATUS AND IMAGING METHOD

(71) Applicant: OLYMPUS CORPORATION, Hachioji-shi, Tokyo (JP)

(72) Inventor: Koichi Shintani, Hachioji (JP)

(73) Assignee: Olympus Corporation, Tokyo (JP)

( * ) Notice: Subject to any disclaimer, the term of this patent is extended or adjusted under 35 U.S.C. 154(b) by 46 days.

(21) Appl. No.: 15/480,728

(22) Filed: Apr. 6, 2017

(65) Prior Publication Data
US 2017/0302862 A1    Oct. 19, 2017

(30) Foreign Application Priority Data
Apr. 19, 2016   (JP) .................. 2016-083573

(51) Int. Cl.
| | | |
|---|---|---|
| G06T 3/40 | (2006.01) | |
| H04N 5/232 | (2006.01) | |
| G06T 7/00 | (2017.01) | |
| H04N 9/04 | (2006.01) | |

(52) U.S. Cl.
CPC .......... *H04N 5/23212* (2013.01); *G06T 3/40* (2013.01); *G06T 7/0002* (2013.01); *H04N 5/232* (2013.01); *H04N 5/232935* (2018.08); *H04N 9/045* (2013.01)

(58) Field of Classification Search
CPC .......... H04N 5/23212; H04N 5/23222; H04N 5/23293; H04N 5/23219; G03B 13/32; G03B 13/34; G02B 7/06; G06T 7/00–7/97
See application file for complete search history.

(56) References Cited

U.S. PATENT DOCUMENTS

| | | | | |
|---|---|---|---|---|
| 6,301,440 B1* | 10/2001 | Bolle | ................. | G06K 9/00664 |
| | | | | 348/229.1 |
| 2011/0157385 A1* | 6/2011 | Hoshino | ................. | G03B 3/00 |
| | | | | 348/208.99 |
| 2012/0121129 A1* | 5/2012 | Okamoto | ........... | H04N 5/23212 |
| | | | | 382/103 |

FOREIGN PATENT DOCUMENTS

JP         2014-053666         3/2014

* cited by examiner

*Primary Examiner* — Paul M Berardesca
(74) *Attorney, Agent, or Firm* — John C. Pokotylo; Pokotylo Patent Services

(57) ABSTRACT

An imaging apparatus includes an imaging section, a display section, an image analysis section, and an auxiliary image creating section. The imaging section images an object to acquire image data concerning the object. The display section displays an image based on the image data. The image analysis section analyzes features of the image data. The auxiliary image creating section determines at least one piece of application processing useful for confirmation of a focus state of the object in the image displayed in the display section from the analyzed features of the image data, sets imaging conditions of the imaging section in correspondence with the determined application processing, and then operates the imaging section to create an auxiliary image.

5 Claims, 6 Drawing Sheets

IMAGING APPARATUS AND IMAGING METHOD

CROSS-REFERENCE TO RELATED APPLICATIONS

This application is based upon and claims the benefit of priority from the prior Japanese Patent Application No. 2016-083573, filed Apr. 19, 2016, the entire contents of which are incorporated herein by reference.

BACKGROUND OF THE INVENTION

1. Field of Invention

The present invention relates to an imaging apparatus and an imaging method.

2. Description of the Related Art

In an imaging apparatus, there is known a technology of enlarging a region in a part of an image which is displayed as a through image at the time of, e.g., manual focusing to facilitate confirmation of a focus state by using the image displayed in a display section. In relation to this technology, for example, a digital camera in Jpn. Pat. Appln. KOKAI Publication No. 2014-53666 decides whether super-resolution processing is to be executed to a region which is enlarged in an image in correspondence with a result of determining whether a region used in focus adjustment is included in the region to be enlarged.

BRIEF SUMMARY OF THE INVENTION

According to a first aspect of the invention, there is provided an imaging apparatus comprising: an imaging section which images an object to acquire image data concerning the object; a display section which displays an image based on the image data; an image analysis section which analyzes features of the image data; and an auxiliary image creating section which determines at least one piece of application processing useful for confirmation of a focus state of the object in the image displayed in the display section from the analyzed features of the image data, sets imaging conditions of the imaging section in correspondence with the determined application processing, and then operates the imaging section to create an auxiliary image.

According to a second aspect of the invention, there is provided an imaging method comprising: imaging an object by an imaging section to acquire image data concerning the object; displaying an image based on the image data in a display section; analyzing features of the image data; determining at least one piece of application processing useful for confirmation of a focus state of the object in the image displayed in the display section from the analyzed features of the image data; and setting imaging conditions of the imaging section in correspondence with the determined application processing, and then operating the imaging section to create an auxiliary image.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
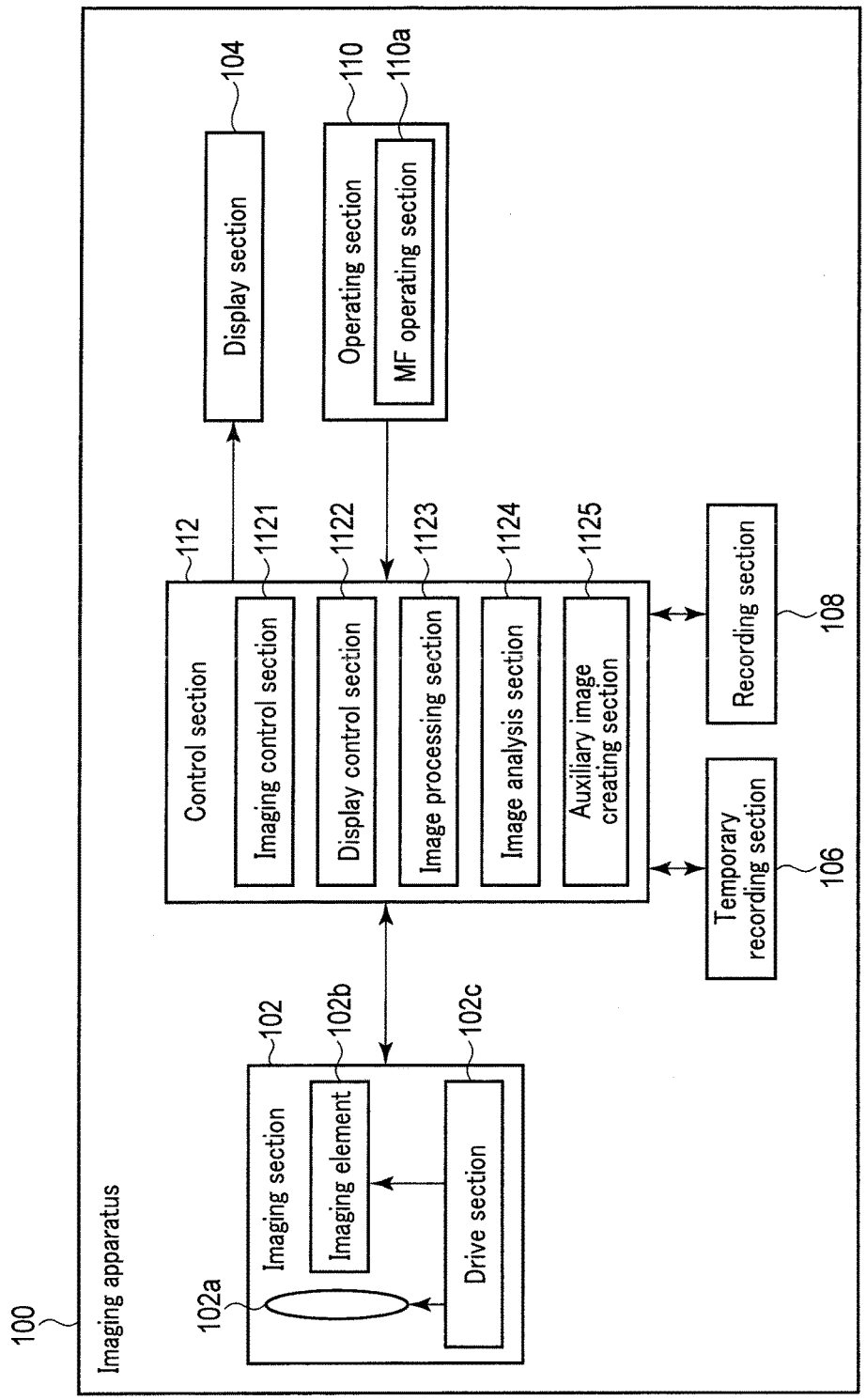
FIG. 1 is a block diagram showing a configuration of an example of an imaging apparatus according to an embodiment of the present invention.

An embodiment of the present invention will now be described hereinafter with reference to the drawings. FIG. 1 is a block diagram showing a configuration of an example of an imaging apparatus according to an embodiment of the present invention. An imaging apparatus 100 shown in FIG. 1 corresponds to various kinds of mobile terminals such as a digital camera, a mobile phone with a camera function, or a smartphone. The imaging apparatus 100 shown in FIG. 1 includes an imaging section 102, a display section 104, a temporary recording section 106, a recording section 108, an operating section 110, and a control section 112.

The imaging section 102 includes an imaging optical system 102*a*, an imaging element 102*b*, and a drive section 102*c*. The imaging optical system 102*a* includes a diaphragm, a lens, or the like, and allows a luminous flux from a non-illustrated subject to enter the imaging element 102*b*. The imaging optical system 102*a* includes a focus lens to adjust a focusing state. The imaging element 102*b* includes, e.g., a COMS image sensor or a CCD image sensor, images the subject, and acquires image data concerning the subject. The imaging element 102*b* may include a phase difference detection pixel so that a distance to a photographing object can be detected. Further, the imaging element 102*b* in this embodiment is configured to be movable within a plane orthogonal to an optical axis of the imaging optical system 102*a*. The drive section 102*c* drives the focus lens of the imaging optical system 102*a* along its optical axis direction or drives the imaging element 102*b* under control of the control section 112.

The display section 104 is, e.g., a liquid crystal display or an organic EL display, and displays various kinds of images such as an image based on the image data acquired by the imaging section 102. Here, the display section 104 in this embodiment may be configured as a peeping type electronic viewfinder.

The temporary recording section 106 is a volatile memory such as an RAM, and also a recording medium to temporarily record various kinds of data. The temporary recording section 106 temporarily records image data to create, e.g., an auxiliary image.

The recording section 108 is a nonvolatile memory such as a flash memory, and also a recording medium to record various kinds of data. The recording section 108 records an image file acquired as a result of, e.g., a photographing operation. Furthermore, the recording section 108 records a program used for control of the imaging apparatus 100.

The operating section 110 is an operation member to operate the imaging apparatus 100 by a user. The operating section 110 includes a power supply switch, a release button, and others as operation members. The power supply switch is an operation member to give an instruction of turning on/off a power supply of the imaging apparatus 100. The release button is an operation member to give an instruction of starting photography. Moreover, the operating section 110 may include other operation members such as a touch panel. Additionally, in this embodiment, the operating section 110 includes a manual focus (MF) operating section 110a. The MF operating section 110a is an operation member to manually perform focus adjustment of the imaging optical system 102a by the user. The MF operating section 110a is, e.g., a focus ring formed around a lens barrel in which the imaging optical system 102a is accommodated. However, the MF operating section 110a is not restricted to the focus ring. As a matter of course, to facilitate observation, automatic control may be adopted in place of manual control, and a control target does not have to be restricted to focusing. A circuit for such control could be mounted in the control section as required.

The control section 112 is a control circuit such as a CPU or an ASIC, and totally controls operations of the imaging apparatus 100. The control section 112 has a function as an imaging control section 1121, a function as a display control section 1122, a function as an image processing section 1123, a function as an image analysis section 1124, and a function as an auxiliary image creating section 1125. Here, each function of the control section 112 may be realized by single hardware or software, or may be realized by pieces of hardware or software. Further, some functions may be provided separately from the control section 112.

The imaging control section 1121 controls an imaging operation of a subject performed by the imaging section 102 and a reading operation of image data from the imaging section 102 The display control section 1122 executes control at the time of displaying various kinds of images in the display section 104.

The image processing section 1123 executes various kinds of image processing to image data. This image processing includes white balance processing, gradation correction processing, and the like. Furthermore, this image processing includes synthesis processing to synthesize pieces of image data.

The image analysis section 1124 analyzes features of image data. The features of the image data include, e.g., luminance, contrast, colors, and movement of a specific object in the image data. The specific object is, e.g., an object which is considered important in the image data. The object considered important is, e.g., a face when a photography object is a person. Besides, the object considered important may be present in a central part in the image data or present at a short distance. The auxiliary image creating section 1125 creates an auxiliary image. The auxiliary image is an image to aid confirmation of a focus state of an object by the user. As will be described later in detail, the auxiliary image is created in correspondence with at least one of features of image data analyzed by the image analysis section 1124, features of an operation or an operating state, features of a device, and a control target.

Figure 2:
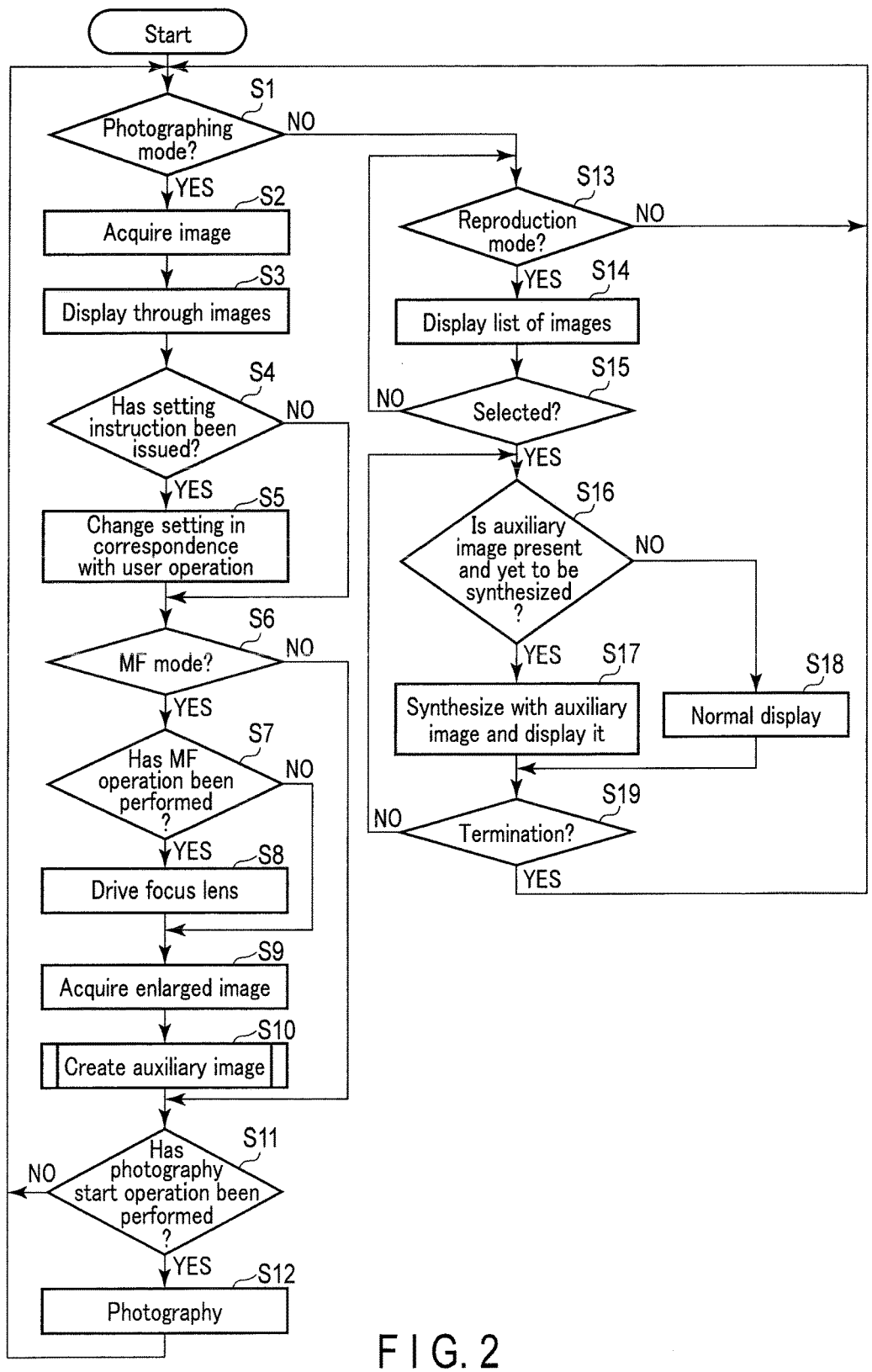
FIG. 2 is a flowchart showing main processing of the imaging apparatus according to an embodiment of the present invention.

An operation of the imaging apparatus according to this embodiment will now be described. FIG. 2 is a flowchart showing main processing of the imaging apparatus according to this embodiment. The processing in FIG. 2 is mainly carried out by the control section 112. Moreover, in the following description, the imaging apparatus 100 is assumed to have a photographing mode and a reproduction mode as operation modes. The photographing mode is a mode to record an image acquired by photography in the recording section 108. The reproduction mode is a mode to reproduce the image recorded in the photographing mode. Of course, the imaging apparatus 100 may have any other mode than the photographing mode and the reproduction mode as an operation mode. The operation modes are set by, an operation of the operating section 110 performed by the user.

The processing in FIG. 2 is started when, e.g., the power supply of the imaging apparatus 100 is turned on. At a step S1, the control section 112 determines whether the operation mode of the imaging apparatus 100 has been the photographing mode. When the operation mode of the imaging apparatus 100 is determined to be the photographing mode at the step S1, the processing advances to a step S2. When the operation mode of the imaging apparatus 100 is not the photographing mode, namely, determined to be the reproduction mode at the step S1, the processing advances to a step S13.

At the step S2, the control section 112 starts an imaging operation using the imaging section 102 to acquire image data for through image display. At a step S3, the control section 112 performs the through image display. As the through image display, the control section 112 carries out the image processing to the image data acquired by the operation of the imaging section 102 at the step S2. Additionally, the control section 112 sequentially displays through images based on the image data subjected to the image processing in the display section 104. After the start of such through image display, the processing advances to a step S4.

At the step S4, the control section 112 determines whether a setting instruction to the imaging apparatus 100 has been issued by the user. The setting instruction is given by, e.g., an operation of the operating section 110 performed by the user on a menu screen displayed in the display section 104. This setting instruction includes, e.g., an instruction to change a focus mode of the imaging apparatus 100. The focus mode includes an MF mode which involves at least a focusing operation performed by the user. When it has been determined that the setting instruction has been issued by the user at the step S4, the processing advances to a step S5. When it has been determined that the setting instruction has not been issued by the user at the step S4, the processing advances to a step S6.

At the step S5, the control section 112 changes various kinds of settings concerning the imaging apparatus 100 in correspondence with the user's settings. After changing the settings, the processing advances to the step S6.

At the step S6, the control section 112 determines whether the focus mode is the MF mode. For example, when the focus mode is changed to the MF mode in response to an instruction to change the focus mode, the focus mode is determined to be the MF mode at the step S6. Alternatively, even if the focus mode is other than the MF mode, the focus mode is the MF mode when the MF operating section 110a is operated. In this case, likewise, the focus mode is determined to be the MF mode at the step S6. When the focus mode has been determined to be the MF mode at the step S6, the processing advances to a step S7. When the focus mode has been determined not to be the MF mode at the step S6, the processing advances to a step S11.

At the step S7, the control section 112 determines whether an operation of the MF operating section 110a has been performed by the user. When it has been determined that the operation of the MF operating section 110*a* has been performed by the user at the step S7, the processing advances to a step S8. When it has been determined that the operation of the MF operating section 110*a* has not been performed by the user at the step S7, the processing advances to a step S9.

At the step S8, the control section 112 drives the focus lens of the imaging optical system 102*a* in correspondence with the operation of the MF operating section 110*a*. Then, the processing advances to the step S9.

At the step S9, the control section 112 acquires an enlarged image from the image data obtained by the imaging section 102. Then, the processing advances to a step S10. As enlarged image acquisition processing, the control section 112 operates the imaging section 102 to cut out partial image data from the obtained image data. Further, the control section 112 acquires an enlarged image by enlarging the cutout image data. Here, the cutout range is a range designated by, e.g., a user. Of course, it may be a fixed range. In case of the fixed range, the cutout range is, e.g., a range in which a position of the best focus in the acquired image data is the center. The position of the best focus is determined on the basis of, e.g., contrast obtained from the image data. Further, a size of the cutout range may be fixed or may be designated by a user. Furthermore, a magnification of enlargement may be fixed or may be designated by the user.

At a step S10, the control section 112 executes auxiliary image creation processing. After the auxiliary image creation processing, the processing advances to a step S11. The auxiliary image creation processing will now be described hereinafter.

Figure 3:
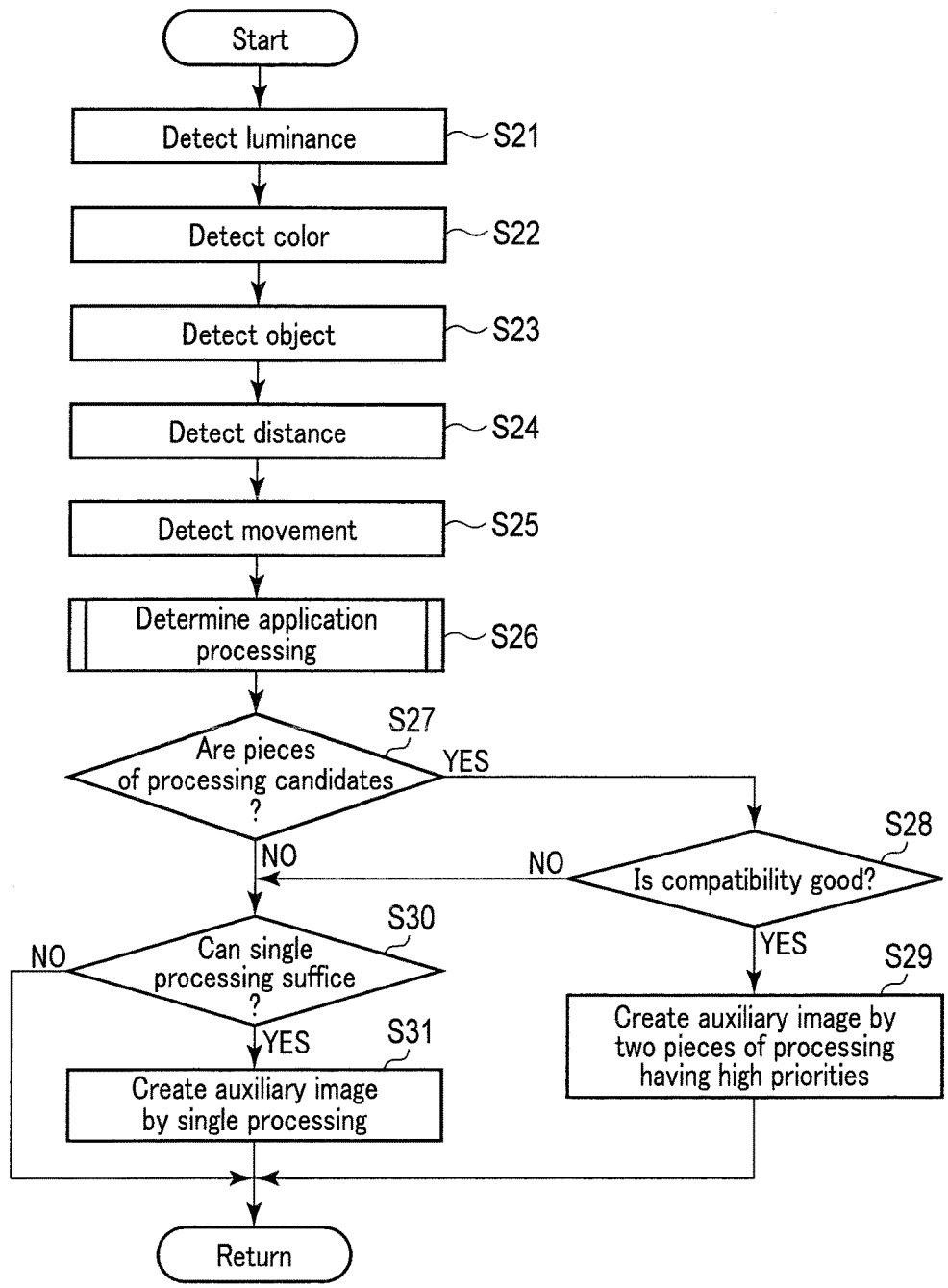
FIG. 3 is a flowchart showing auxiliary image creation processing.

FIG. 3 is a flowchart showing the auxiliary image creation processing.

At a step S21, the control section 112 detects a luminance distribution of an enlarged image. The luminance is obtained by, e.g., multiplying data of each pixel by a predetermined coefficient in accordance with each color and adding products.

At a step S22, the control section 112 detects a color distribution of the enlarged image.

At a step S23, the control section 112 detects an object in the enlarged image. The object is detected by using, e.g., edge detection or template matching. For example, if the object is a person's face, the object is an enlarged image detected by matching using a template of faces. Thus, usually, the number of object is one. Of course, since there is a possibility that objects are included in the enlarged image, the objects may be detected at the step S23. If the objects are detected, one closer to the center may be solely detected.

At a step S24, the control section 112 detects a photographing distance to the object. For example, if the imaging element 102*b* includes a phase difference detection pixel, the photographing distance can be detected by a well-known phase difference system. Besides, a relative photographing distance may be detected by comparing contrast evaluation values of respective portions in the image data. The contrast evaluation value is obtained by, e.g., integrating luminance generated from the image data in accordance with each predetermined region.

At a step S25, the control section 112 detects movement of the object in the image data. The movement of the object is detected by a motion vector between pieces of image data of frames.

Figure 4:
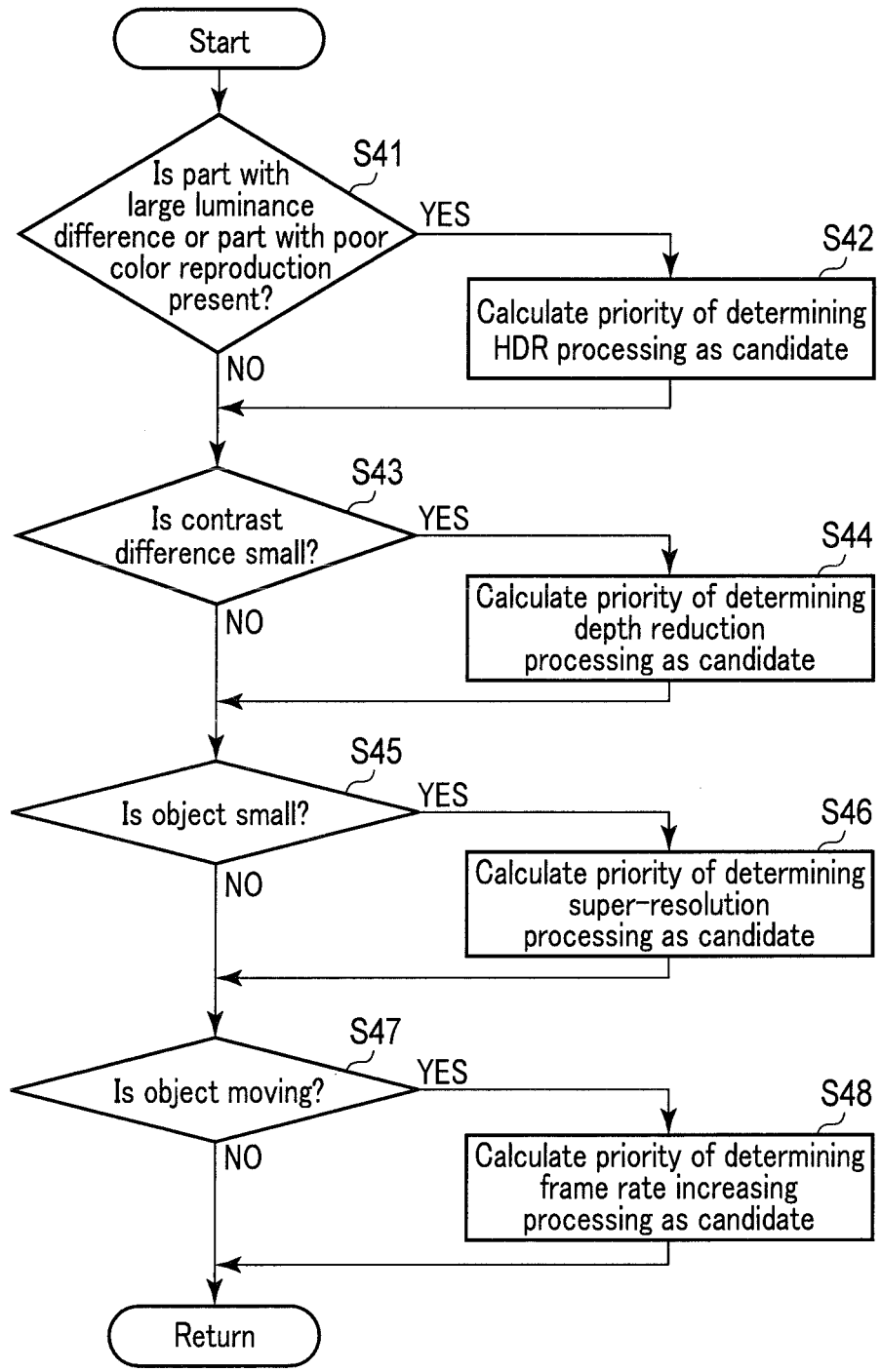
FIG. 4 is a flowchart showing determination processing for application processing.

At a step S26, the control section 112 determines processing which is applied to create an auxiliary image on the basis of the information detected at the steps S21 to S25. Hereinafter, determination processing for application processing will be described. FIG. 4 is a flowchart showing the determination processing for the application processing.

At a step S41, the control section 112 determines whether the object has a portion with a large luminance difference or the object has a portion of poor color reproduction. The portion with a large luminance difference is determined on the basis of whether a difference in luminance between a pixel corresponding to an edge portion of the object and its adjacent pixel exceeds a predetermined value. The color reproduction is determined on the basis of whether a specific color is reproduced in accordance with each object. For example, if the object is a person's face, whether a predetermined appropriate skin color is reproduced in an image (whether a difference between the appropriate skin color and a color in a face portion of the image data is a predetermined value or less) is determined. When the portion with a large luminance difference or the portion with poor color reproduction has been determined to be present at the step S41, the processing advances to a step S42. When it has been determined that the portion with a large luminance difference is not present and the portion with poor color reproduction is not present either at the step S41, the processing advances to a step S43.

At the step S42, the control section 112 determines high dynamic range (HDR) processing as a candidate for the application processing. Furthermore, the control section 12 also calculates a priority of the HDR processing. The priority is a proportion of the portion with a large luminance difference and the portion with poor color reproduction in the enlarged image. Then, the processing advances to the step S43. The HDR processing is processing of enlarging a dynamic range of image data by synthesizing pieces of image data obtained by imaging performed more than once with different exposures. That is, in the HDR, it is possible to make brightness of each portion with a large luminance difference proper or make color reproduction proper by changing exposure of the portion of poor color reproduction alone. When a luminance difference is large or color reproduction of the object is poor in the image data, executing the HDR processing improves visibility of the object.

At the step S43, the control section 112 determines whether a difference in contrast in the object is small. For example, when a difference between contrast evaluation values near the object is smaller than a predetermined value, the difference in contrast is determined to be small at the step S43. When the difference in contrast has been determined to be small at the step S43, the processing advances to a step S44. When the difference in contrast has been determined not be small at the step S43, the processing advances to a step S45.

At the step S44, the control section 112 determines depth reduction processing as a candidate for the application processing. Moreover, the control section 112 calculates a priority of the depth reduction processing. The priority is a proportion of a portion with a small contrast difference in an enlarged image. Then, the processing advances to a step S45. The depth reduction processing is processing of emphasizing contrast of a focused portion by synthesizing pieces of intentionally defocused image data. Consequently, the focused portion becomes clearer. It is to be noted that the depth reduction processing is processing of reducing contrast of a portion around a focused portion to emphasize contrast of the focused portion. A technique for this processing does not have to necessarily involve synthesis processing. For example, correcting a gradation of a defocused portion or adding blurring can also obtain the same effect as that of the depth reduction processing.

At the step S45, the control section 112 determines whether the object is small. For example, when a proportion of a size of the object in the image data before enlargement (a value obtained by dividing an area of the object in the enlarged image detected at the step S23 by a magnification) is smaller than a predetermined value, the object is determined to be small at the step S45. It is to be noted that, in calculation of an area of the object in the enlarged image, taking the photographing distance into consideration is more desirable. When the object has been determined to be small at the step S45, the processing advances to a step S46. When the object has been determined not to be small at the step S45, the processing advances to a step S47.

At the step S46, the control section 112 determines super-resolution processing as a candidate for the application processing. Further, the control section 112 calculates a priority of the super-resolution processing. The priority is a proportion of the object in the enlarged image. The super-resolution processing is a processing of synthesizing pieces of image data obtained by photographing performed more than once while shifting the imaging element 102b in the unit of a pixel pitch or less (e.g., 0.5 pixel) to increase a resolution of the image data. Even if the object is enlarged by the super-resolution processing, high definition is maintained. Thus, the visibility of the object in the enlarged image is improved.

At the step S47, the control section 112 determines whether the object is moving. When it has been determined that the object is moving at the step S47, the processing advances to a step S48. When it has been determined that the object is not moving at the step S47, the processing in FIG. 4 is terminated.

At the step S48, the control section 112 determines processing of increasing a frame rate of imaging as a candidate for the application processing. Then, the processing in FIG. 4 is terminated. Increasing the frame rate enables accurately capturing the moving object.

In FIG. 4, there are, as candidates for the application processing, there are the HDR processing, the depth reduction processing, the super-resolution processing, and the frame rate increasing processing. However, the candidates for the application processing are not restricted to these pieces of processing. Processing useful for confirmation of a focus state of the object can be a candidate for the application processing other than these candidates. For example, noise reduction processing is considered to be one of processing useful for confirmation of a focus state of the object. This usefulness is particularly usefulness corresponding to a user operation or associated with a user operation, and usefulness which not only simply improves the visibility but also contributes to a user determination before and after an operation or during an operation can be also assumed. Thus, the application processing may be changed in accordance with characteristics of a device to be operated, features of an observation target in an operation, or the like. Additionally, it can be also assumed that later-described various kinds of effects or processing are selected by table reference or weighting processing in correspondence with such conditions. Although an auxiliary image subjected to useful processing may be created when the imaging section which images an object to acquire image data concerning the object, the display section which displays an image based on the image data, and the image analysis section which analyzes features of the image data are provided, at least one piece of application processing useful for imaging adjustment confirmation (e.g., focus adjustment) of the object in the image displayed in the display section maybe determined in correspondence with features of the device itself or a situation of an operation member or an operation.

Imaging conditions of the imaging section are set in correspondence with the application processing determined as described above, and then the imaging operation is operated, thereby creating the auxiliary image. According to the imaging apparatus including such an auxiliary image creating section, an operation of object confirmation performed by the user in a better way can be accelerated and simplified. When the operation is finished, these pieces of processing may be terminated. The processing does not have to be constantly performed if it is not required even during the operation. Further, this concept may be applied to automatic adjustment, usefulness to a control target rather than the operation is taken into consideration.

Here, the description of FIG. 3 will be again given. At a step S27, the control section 112 determines whether pieces of processing have become candidates for the application processing. When it has been determined that the pieces of processing have become the candidates for the application processing at the step S27, the processing advances to a step S28. When it has been determined that the pieces of processing have not become the candidates for the application processing, the processing advances to a step S30.

At the step S28, the control section 112 determines whether compatibility among the pieces of the application processing which have become the candidates is good. The HDR processing, the depth reduction processing, the super-resolution processing, the frame rate increasing processing described above have the compatibility. For example, in the super-resolution processing, since definition of a blurry portion in an image is increased, compatibility with the depth reduction processing which emphasizes blur in the image is not good. Furthermore, since the HDR processing, the depth reduction processing, and the super-resolution processing are processing including synthesis of images, increasing a frame rate is difficult. Thus, the HDR processing, the depth reduction processing, and the super-resolution processing do not have the good compatibility with the frame rate increasing processing. At the step S28, whether the compatibility among these pieces of application processing is good is determined. On the other hand, the HDR processing has the excellent compatibility with the processing other than the frame rate increasing processing. It is to be noted that the example of compatibility is not restricted to those described above. When the compatibility among the pieces of candidate application processing has been determined to be good at the step S28, the processing advances to a step S29. When the compatibility among the pieces of candidate application processing has been determined not to be good at the step S28, the processing advances to the step S30.

At the step S29, the control section 112 creates an auxiliary image. The auxiliary image is created by using, e.g., two pieces of application processing with high priorities selected from the HDR processing, the depth reduction processing, and the super-resolution processing. The two pieces of processing with a high degree of probability for improvement are executed on a priority basis. Although the example where only two types of application processing are used has been described here, its purpose is to reduce a time required for creation of the auxiliary image. If time allows, three types of processing may be carried out without considering priorities. Moreover, if the compatibility of the two types of application processing with higher priorities is poor, another combination, e.g., applying the application example having the next high priority may be adopted to carry out the processing.

Figure 5:
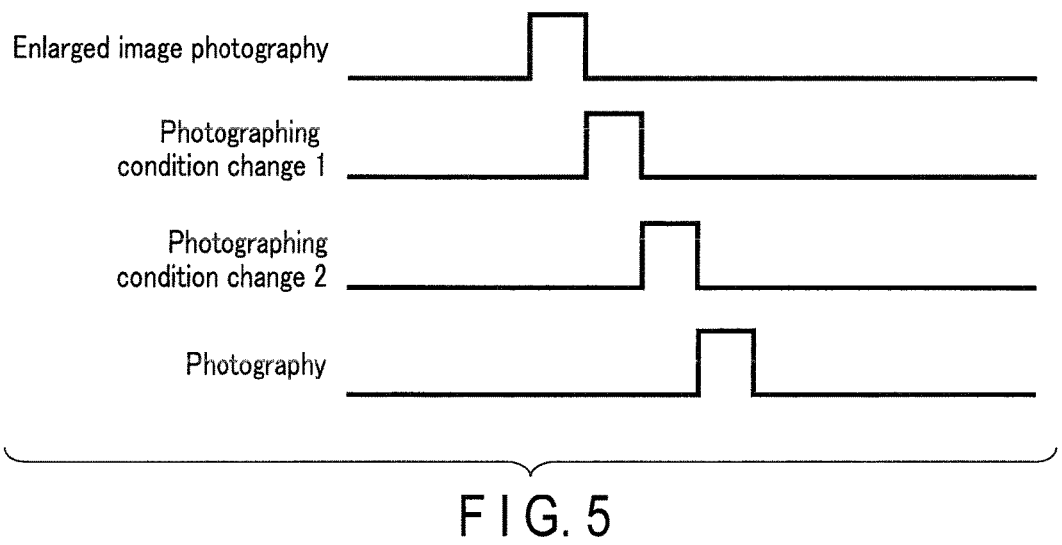
FIG. 5 is a view showing an outline of the auxiliary image creation processing.

FIG. 5 is a view showing an outline of the auxiliary image creation processing. As shown in FIG. 5, at the time of creating the auxiliary image, the control section 112 sets imaging conditions so that photography is performed under the imaging conditions determined in accordance with each application processing. The control section 112 sets an imaging condition 1 concerning application processing 1, and then sets an imaging condition 2 concerning application processing 2. The imaging condition is an exposure in case of the HDR processing, a position of the focus lens in case of the depth reduction processing, or a shifting position of the imaging element 102b in case of the super-resolution processing. After setting the imaging conditions 1 and 2, the control section 112 executes a photographing operation. Consequently, the auxiliary image changed from an original image under the imaging condition 1 and the imaging condition 2 is created.

The created auxiliary image is synthesized with the original enlarged image as required. This synthesized enlarged image is an image having the visibility improved beyond that of the original enlarged image. When the synthesized enlarged image is displayed in the display section 104 in the MF mode, the user can further excellently confirm a focus state of the object during photography. The synthesized enlarged image may be created in accordance with an operation of the user in, e.g., the reproduction mode rather than the MF mode. In this case, the user can further excellently confirm the focus state of the object after the photography.

Figure 6:
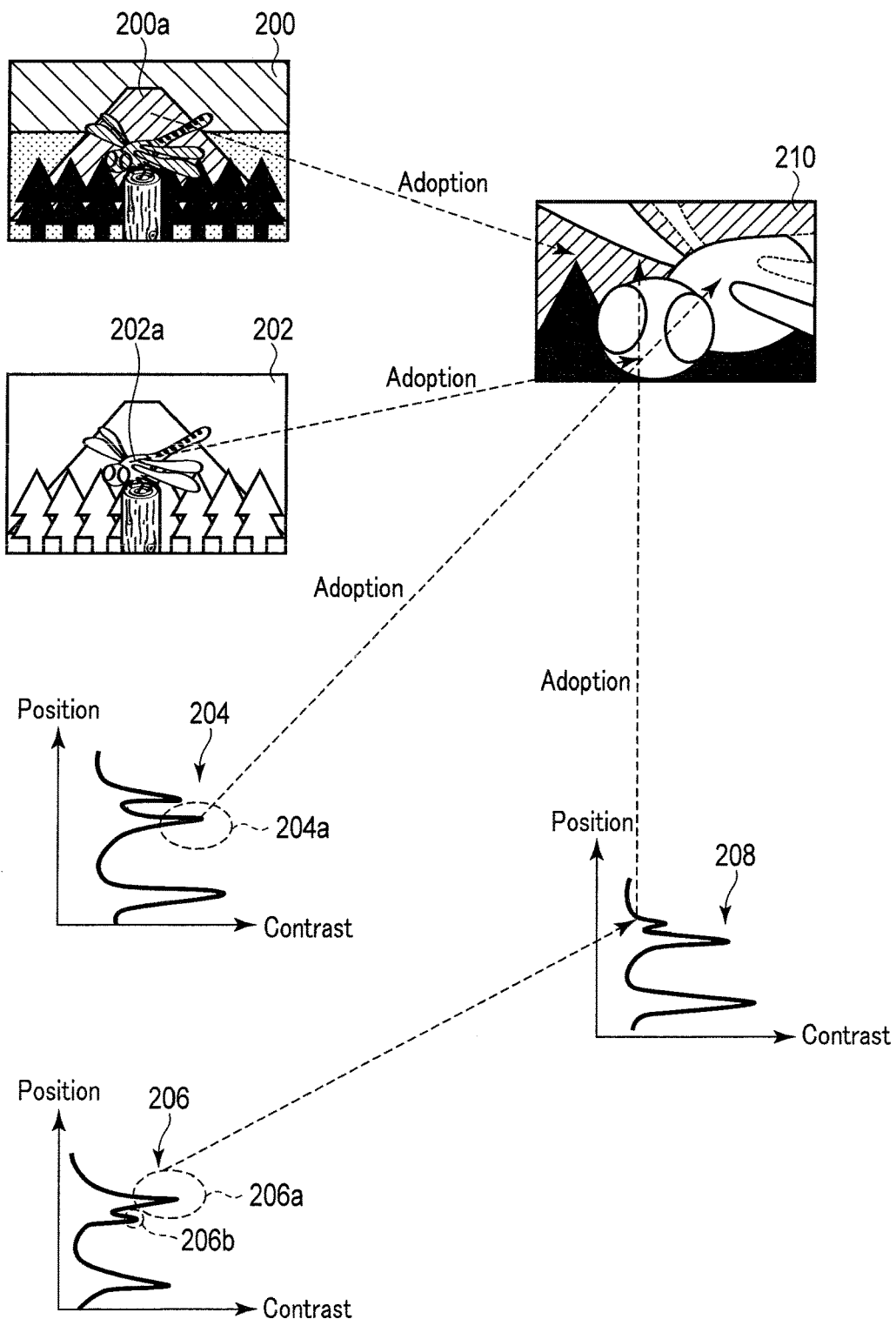
FIG. 6 is a view for explaining a specific example of the auxiliary image creation processing.

A concrete description will now be given hereinafter. FIG. 6 is a view for explaining a specific example of the auxiliary image creation processing. In scenes in FIG. 6, it is assumed that a user tries performing MF photography to a dragonfly resting on a plant which is an object of the photography.

An image 200 in FIG. 6 is an original image. In the image 200, the dragonfly as the object of the photography is in a backlight state. At this time, a luminance difference between a mountain as a background 200a and the dragonfly as the object is large, and color reproduction of the dragonfly is poor. Thus, the HDR processing is adopted as first application processing. On the other hand, a vertical contrast distribution of the dragonfly part in the original image is as indicated by reference numeral 204 in FIG. 6. Here, an axis of abscissa represents a position (a photographing distance). When a value of the axis of abscissa in FIG. 6 increases, it means a far distance. On the other hand, an axis of ordinate in FIG. 6 represents contrast of the object. When a value of the axis of ordinate in FIG. 6 increases, it means that the contrast is high. As shown in FIG. 6, a contrast distribution 204 has three contrast peaks. Positions of these peaks correspond to positions of a head, a body, and a tail of the dragonfly as seen from a near distance side. In the contrast distribution 204, a difference in contrast between the tail and the body 204a is small. Thus, the depth reduction processing is adopted as second application processing.

The control section 112 sets an exposure as the imaging condition concerning the HDR processing to be higher than an exposure in photography of the original image (sets brightness of the dragonfly as the object to an appropriate value). Furthermore, the control section 112 sets a position of the focus lens as the imaging condition concerning the depth reduction processing to the same position as that at the time of imaging of the original image. After these settings, the control section 112 performs an imaging operation of the auxiliary image. An image 202 in FIG. 6 is obtained by this imaging operation. In the image 202 in FIG. 6, brightness of a dragonfly 202a part has an appropriate value. On the other hand, a background part other than the dragonfly 202a undergoes halation.

Subsequently, the control section 112 sets an exposure as the imaging condition concerning the HDR processing to be the same as that at the time of first imaging of the auxiliary image. Furthermore, the control section 112 sets a position of the focus lens as the imaging condition concerning the depth reduction processing to, e.g., a position on the far distance side as compared with that in imaging of the auxiliary image (imaging of the original image). A shift mount of the position of the focus lens is, e.g., a fixed amount, and it is a position which is out of a depth of field. After these settings, the control section 112 performs the imaging operation of the auxiliary image. For example, a contrast distribution of the auxiliary image acquired by the imaging operation when the position of the focus lens is shifted to the far distance side is as indicated by reference numeral 206 in FIG. 6. In the contrast distribution 206, a tail 206a part has high contrast, and a body 206b part has low contrast. Thus, it can be understood that a focusing position in the original image 200 is the body 206b part.

Therefore, the control section 112 sets the exposure as the imaging condition concerning the HDR processing to be the same as that in the first imaging of the auxiliary image.

Furthermore, the control section 112 sets the position of the focus lens as the imaging condition concerning the depth reduction processing to a position of the tail 206a part in a contrast reducing direction, which is a position on the short distance side in the example of FIG. 6. After these settings, the control section 112 performs the imaging operation of the auxiliary image. For example, a contrast distribution of the auxiliary image acquired by the imaging operation when the position of the focus lens is shifted to the short distance side is as indicated by reference numeral 208 in FIG. 6. In the contrast distribution 208, the tail part has low contrast, and the body part has high contrast.

Subsequently, the control section 112 determines portions to be adopted from the respective auxiliary images, and synthesizes them to create a synthesized image. First, the control section 112 adopts the background 200a part in the original image 200 for a background part in the synthesized image. Moreover, the control section 112 adopts a head part of the dragonfly in the first auxiliary image (the image whose exposure corresponds to the auxiliary image 202 and whose contrast distribution is the contrast distribution 204) for a head part and a body part of the dragonfly in the synthesized image. Additionally, the control section 112 adopts a tail part of the dragonfly in the third auxiliary image (the image whose exposure corresponds to the auxiliary image 202 and whose contrast distribution is the contrast distribution 208) for a tail part of the dragonfly in the synthesized image. Then, the control section 112 cuts out image data in the same cutout range as the original enlarged image from the synthesized image. Further, the control section 112 enlarges the cutout image data to acquire a synthesized enlarged image. As indicated by reference numeral 210 in FIG. 6, such a synthesized enlarged image is an image which has proper brightness in the dragonfly part and in the background part by the HDR processing and also has a clear difference in focus state between the body and the tail of the dragonfly by the depth reduction processing. With such a synthesized enlarged image, a user can confirm a focus state of the dragonfly which is an object in a better way. It is to be noted that whether the synthesized enlarged image is to be created is preset by the user's operation using the operating section 110. When creation of no synthesized enlarged image is specified, the created auxiliary images are associated with an image file obtained by later photography and recorded in the recording section 108.

Here, the description of FIG. 3 will now be again given. At a step S30, the control section 112 determines whether single application processing alone can be performed. For example, if the number of pieces of processing as the candidates for the application processing has been determined to be one at the step S26 or if the compatibility among the candidates for the application processing has been determined to be poor at the step S28, the determination of the step S30 is performed. At the step S30, for example, confirmation display to show the user the application processing performed at the time of creation of the auxiliary image is carried out in, e.g., the display section 104. When pieces of incompatible application processing are candidates, the application processing having the highest priority among them is displayed. The user who has seen this confirmation display operates the operating section 10 to give an instruction concerning whether single application processing alone may be carried out. On the basis of this instruction, the judgment of the step S30 is performed. When it has been determined that the single application processing alone maybe carried out at the step S30, the processing advances to a step S31. When it has been determined that the single application processing alone does not have to be carried out at the step S30, the processing of FIG. 3 is terminated.

At the step S31, the control section 112 uses the single application processing to create the auxiliary image. Then, the processing of FIG. 3 is terminated. A method of creating the auxiliary image is basically the same as that in case of creating the auxiliary image with the use of two pieces of application processing. That is, in case of creating the auxiliary image with the use of two pieces of application processing, imaging conditions corresponding to the two pieces of application processing respectively are set and then imaging is performed but, in case of creating the auxiliary image with the use of single application processing, the imaging condition corresponding to this application processing is set and then imaging is performed.

Here, a description will be again given to FIG. 2. At the step S11, the control section 112 determines whether the user has performed a photography start operation. The photography start operation is, e.g., a pressing operation of a release button or a touch operation to a predetermined position on a touch panel. When it has been determined that the user has not performed the photography start operation at the step S11, the processing returns to the step S1. When it has been determined that the user has performed the photography start operation, the processing advances to a step S12.

At the step S12, the control section 112 starts a photographing operation. For example, the control section 112 configures settings, e.g., a setting of an aperture of the imaging optical system 102a, an exposure time of the imaging element 102b, and the like in correspondence with subject luminance. Further, the control section 112 starts an imaging operation of the imaging section 102. Furthermore, the control section 112 executes image processing required for image data acquired by the imaging operation, and records the processed data in the recording section 108. After such a photographing operation, the processing returns to the step S1.

At a step S13, the control section 112 determines whether the operation mode of the imaging apparatus 100 is the reproduction mode. When the operation mode of the imaging apparatus 100 has been determined to be the reproduction mode at the step S13, the processing advances to a step S14. When the operation mode of the imaging apparatus 100 has been determined not to be the reproduction mode at the step S13, the processing returns to the step S1.

At the step S14, the control section 112 displays in the display section 104 a list of image files recorded in the recording section 108.

At a step S15, the control section 112 determines whether one of the image files in the list displayed in the display section 104 has been selected by the user. An image file is selected by, e.g., a touch panel operation performed by a user. When it has been determined that the image file has been selected at the step S15, the processing proceeds to a step S16. When it has been determined that the image file has not been selected at the step S15, the processing returns to the step S13.

At the step S16, the control section 112 determines whether an auxiliary image which is not associated with an image file to be reproduced and not synthesized with image data in the image file to be reproduced is present. As described above, one or more auxiliary images created by the auxiliary image creation processing are synthesized with an original image or not synthesized with the same depending on situations. When it has been determined that the auxiliary image which is not yet synthesized with the image data in the image file to be reproduced is present at the step S16, the processing proceeds to a step S17. When it has been determined that the auxiliary image which is not yet synthesized with the image data in the image file to be reproduced is not present, the processing advances to a step S18.

At the step S17, the control section 112 creates a synthesized enlarged image from auxiliary images recorded in the image file selected by the user, synthesizes the created synthesized enlarged image with the original image, and displays a resultant image in the display section 104. Then, the processing advances to a step S19.

At the step S18, the control section 112 displays an image recorded in the image file selected by the user. Then, the processing advances to the step S19.

At the step S19, the control section 112 determines whether reproduction of the image file is to be terminated. For example, when the user has instructed to terminate the reproduction of the image file by operating the operating section 110, the reproduction of the image file is determined to be terminated. When it has been determined that the instruction to terminate the reproduction of the image file has been issued at the step S19, the processing returns to the step S1. When it has been determine that the instruction to terminate the reproduction of the image file has not been issued, the processing returns to the step S16.

As described above, according to this embodiment, the application processing useful for confirmation of a focus state of the object is executed in correspondence with an analysis result of features of the image data. Consequently, the user can confirm the focus state of the object in a better way. In the foregoing embodiment, the auxiliary image is created after acquisition of the enlarged image. However, the auxiliary image may not be necessarily created after the acquisition of the enlarged image. Moreover, the synthesized enlarged image does not have to be necessarily created, and a simple synthesis of an image recorded in the original image file and the auxiliary image may be displayed in reproduction of the image file.

Additionally, in the foregoing embodiment, as the imaging apparatus, the imaging apparatus intended to record an image of a digital camera or the like has been taken as an example. On the other hand, the technology of this embodiment is applied to various kinds of imaging apparatuses, and it can be also applied to imaging apparatuses which do not record images. In this regard, the technology of this embodiment can be applied to imaging apparatuses such as an endoscope apparatus, a microscope apparatus, or a monitoring apparatus. In particular, effects are exerted in devices which require rigorous visual adjustment, but processing which improves visibility is often processing which is also useful for automatic determination. The present invention assumes a case where automatic control is performed after useful processing, and the processing can be considered useful for automatic control.

Further, each processing according to the foregoing embodiment can be stored as a program which can be executed by the control section 112 which is a computer. Besides, each processing can be stored in a recording medium of an external storage device such as a magnetic disk, an optical disk, or a semiconductor memory, and distributed. Furthermore, the control section 112 reads the program stored in the recording medium of this external storage device, and can execute the above-described processing when operations are controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an image sensor configured to image an object to acquire image data concerning the object;
   a display configured to display an image based on the image data; and
   a processor configured to:
      analyze analyzes features of the image data; and
      determine at least one piece of application processing useful for confirmation of a focus state of the object in the image displayed in the display section from the analyzed features of the image data, sets imaging conditions of the image sensor in correspondence with the determined application processing, and then operates the image sensor to create an auxiliary image,
   wherein, when pieces of application processing are present, the processor determines compatibility among the pieces of application processing, and operates the image sensor in correspondence with the pieces of application processing to create the auxiliary image only when the compatibility is good.

2. The apparatus according to claim 1,
   wherein the application processing includes at least one of high dynamic range processing, depth reduction processing, super-resolution processing, and frame rate increasing processing.

3. The apparatus according to claim 1,
   wherein the imaging apparatus has a manual focus mode configured to enable manual focus adjustment performed by a user as an operation mode, and
   the processor creates the auxiliary image in the manual focus mode.

4. The apparatus according to claim 1,
   wherein the processor synthesizes image data acquired by the image sensor for display in the display with the auxiliary image to create a synthesized image, and
   the display displays the synthesized image.

5. An imaging method comprising:
   imaging an object by an image sensor to acquire image data concerning the object;
   displaying an image based on the image data in a display;
   analyzing features of the image data;
   determining at least one piece of application processing useful for confirmation of a focus state of the object in the image displayed in the display from the analyzed features of the image data; and
   setting imaging conditions of the image sensor in correspondence with the determined application processing, and then operating the image sensor to create an auxiliary image,
   wherein, when pieces of application processing are present, compatibility among the pieces of application processing is determined in the determining, and the image sensor is operated in correspondence with the pieces of application processing to create the auxiliary image in the operating only when the compatibility is good.

\* \* \* \* \*